United States Patent [19]

Tezuka

[11] Patent Number: 4,716,481
[45] Date of Patent: Dec. 29, 1987

[54] RECORDING AND/OR REPRODUCING APPARATUS HAVING AN IMPOSED HEAD SHIFTING FEATURE

[75] Inventor: Nobuo Tezuka, Kanagawa, Japan

[73] Assignee: Canon Kabushiki Kaisha, Tokyo, Japan

[21] Appl. No.: 899,750

[22] Filed: Aug. 21, 1986

Related U.S. Application Data

[63] Continuation of Ser. No. 495,424, May 17, 1983, abandoned.

[30] Foreign Application Priority Data

May 26, 1982 [JP] Japan ................................. 57-89099
May 26, 1982 [JP] Japan ................................. 57-89100
Jun. 2, 1982 [JP] Japan ................................. 57-94365

[51] Int. Cl.[4] .......................... G11B 5/54; G11B 5/58; G11B 5/82
[52] U.S. Cl. ..................................... 360/106; 360/97; 360/109
[58] Field of Search .............. 360/93, 96.1, 96.5, 360/97, 99, 106, 133, 109

[56] References Cited

U.S. PATENT DOCUMENTS

| 3,154,308 | 10/1964 | Faulkner | 360/106 |
| 3,159,040 | 12/1964 | Thomas, Jr. et al. | 360/106 |
| 4,466,032 | 8/1984 | Saito | 360/97 |
| 4,467,380 | 8/1984 | Kato | 360/96.5 |
| 4,511,944 | 4/1985 | Saito | 360/133 |

FOREIGN PATENT DOCUMENTS 2101391 1/1983 United Kingdom ............... 360/133

Primary Examiner—Robert S. Tupper
Assistant Examiner—Melissa J. Koval
Attorney, Agent, or Firm—Toren, McGeady & Associates

[57] ABSTRACT

A recording or reproducing apparatus having a recording or reproducing head, a spring member, a reset member for charging the spring member, a carriage member for moving the recording or reproducing head by the driving force of the spring member and a control mechanism for positioning the recording or reproducing head relative to a recording medium in cooperation with the carriage member.

10 Claims, 6 Drawing Figures

RECORDING AND/OR REPRODUCING APPARATUS HAVING AN IMPOSED HEAD SHIFTING FEATURE

This is a continuation, of application Ser. No. 495,224, filed May 17, 1983, abandoned 10/6/86.

BACKGROUND OF THE INVENTION

1. Field of the Invention

This invention relates to a recording or reproducing apparatus and more particularly to an apparatus using a rotating type recording medium such as a rotating sheet, a rotating disc or a rotating drum.

2. Description of the Prior Art

A recording/reproducing apparatus of the kind adapted for use with a rotating magnetic sheet, disc or drum as the recording medium in recording and/or reproducing information and, particularly, arranged to form recording tracks in a concentric or closed-loop on the recording medium requires a stepwise moving or advancing action on a recording/ reproducing head to shift its position from one recording track to another. Generally, this advancing action has been accomplished by a stepping motor or electromagnetic means such as a plunger. The operating mode of stepping motors is especially suited for advancing the head in a discrete manner. However, the stepping motor not only requires use of a relatively large source of a driving power but also results in a large power consumption. Hence, use thereof has not acceptable for a recording or reproducing apparatus of the portable kind called "handy type" which is entirely dependent on power supply from an internal power source such as a dry cell battery. Moreover, the conventional head advancing arrangement using electromagnetic means such as a plunger or the like tends to become complex in structure resulting in a large size and thus has been not suited for compact apparatus. This disadvantageous tendency has been especially manifest in the case where it has been attempted to provide the apparatus with a counter arrangement adapted for indicating the number of recording tracks in association with a head advancing action.

SUMMARY OF THE INVENTION

An object of the invention is to provide a device for advancing a recording or reproducing head which eliminates the above-stated shortcomings of the recording or reproducing head advancing arrangement of the prior art which is well suited for reduction in size of a recording/reproducing apparatus adapted for low power consumption.

Another object of the invention is to provide a device for advancing a recording or reproducing head having a source of driving force which excels in responsiveness to permit increase in the number of recording tracks which can be covered per unit of time by shifting the position of the recording or reproducing head.

To attain these objects, a recording or reproducing apparatus according to an aspect of the present invention comprises a recording or reproducing head; elastic means; charging means for charging the elastic means with a driving force; moving means for moving the recording or reproducing head by the driving force of the charged elastic means; and control means for controlling the position of the recording or reproducing head relative to a recording medium in cooperation with the advancing means.

A further object of the invention is to provide a recording or reproducing head feeding device wherein, in addition to attaining the above-stated objects, elastic means which serves as the source of a driving force for advancing the recording or reproducing head can be charged by a simple mechanism which is easily operated.

To attain this object, a recording or reproducing apparatus according to an aspect of the invention comprises a recording or reproducing head; elastic means; charging means arranged to charge the elastic means with a driving force in association with an operation performed to remove a recording medium from the recording/reproducing apparatus; and moving means which is arranged to move the recording or reproducing head by the driving force of the elastic means.

A still further object of the invention is to provide a recording or reproducing head advancing device wherein a recording or reproducing head is moved by elastic means and positional control over the head is accomplished by an extremely small control driving force.

To attain the above-stated object, the recording or reproducing head advancing device according to an aspect of the invention comprises a recording or reproducing head; elastic means; moving means for advancing or moving the recording or reproducing head by the driving force of the elastic means; and control means movable for controlling the position of the recording or reproducing head, the control means including means for producing a component of the driving force of the elastic means in the direction of movement of the control means for controlling the position of the recording or reproducing head.

It is an additional object of the invention to provide a recording or reproducing apparatus having indication means which indicates the position of the head relative to the recording medium in association with the advancing action on the recording or reproducing head, because in an apparatus of the type arranged to shift the position of the head for every track, it is convenient for the operator to know the position of the head or the number of the tracks being scanned or the amount of tracks which have been recorded or reproduced.

It is another additional object of the invention to provide a recording or reproducing apparatus having simple and reliable means for counting or measuring the head position or the amount of tracks on which recording or reproduction has been accomplished.

An even further object of the invention is to provide a recording or reproducing apparatus having head position indicating means or track measuring means which is highly responsive to the positional shift of a recording or reproducing head and also contributes to reduction in size of the apparatus.

To attain the above-stated object, a recording or reproducing apparatus arranged as a preferred embodiment of the invention comprises a recording or reproducing head; head advancing means; control means for controlling the position of the recording or reproducing head; counting or measuring means for counting or measuring the head position or the amount of recorded or reproduced tracks; and common drive means arranged to be used in common for driving the control means and the counting or measuring means.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
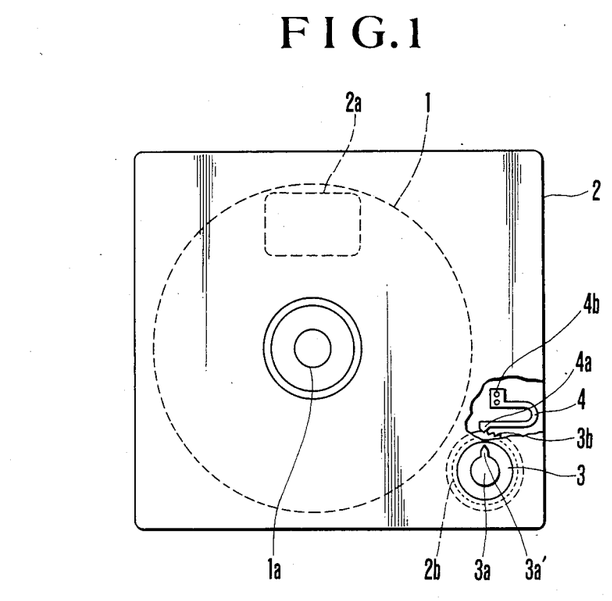
FIG. 1 is a plan view showing a container containing a magnetic sheet.
Figure 3:
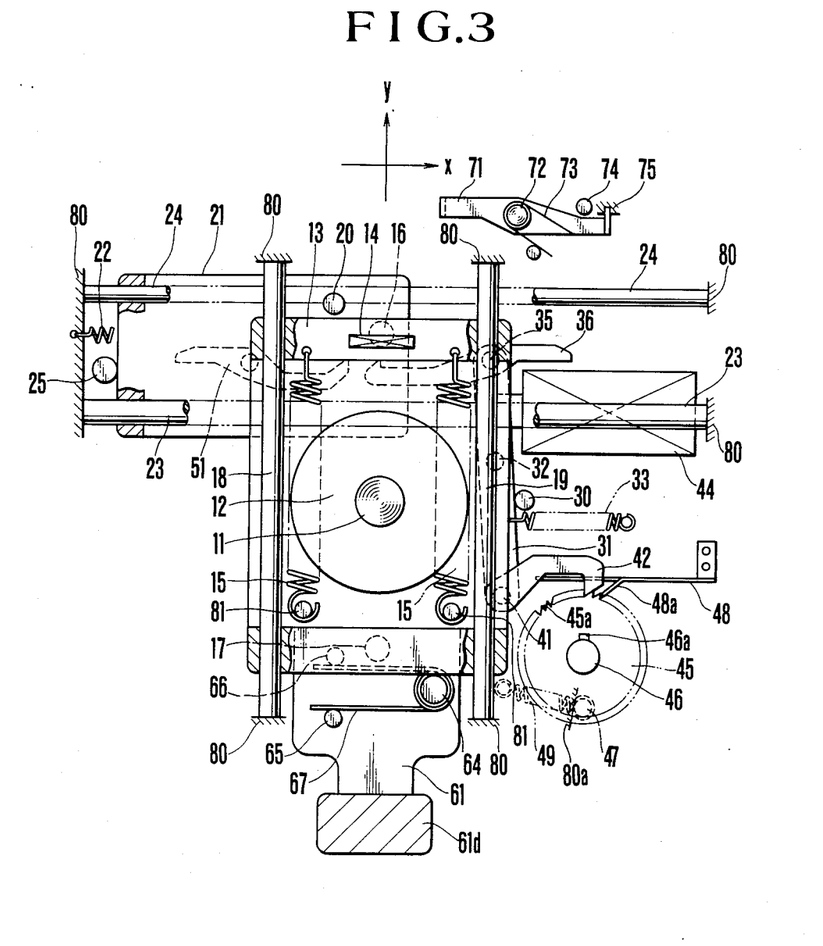
FIG. 3 is a plan view showing an upper portion of a recording or reproducing apparatus embodying the present invention.

Referring to FIG. 1 which shows a container containing a rotating magnetic sheet therein, the rotating magnetic sheet 1 is disposed within the container 2 and is provided with an axial coupling part 1a arranged for coupling to a magnetic sheet drive shaft which is disposed on the body of a recording or reproducing apparatus as indicated by a reference numeral 11 in FIG. 3. With the shaft of this coupling part 1a disposed in the middle part, the magnetic sheet 1 is arranged to have recording tracks concentrically formed thereon. The container 2 is provided with an opening 2a which is disposed on the back side thereof as viewed on FIG. 1. A recording or reproducing head which is, in this specific example, a magnetic recording or reproducing head (hereinafter called the magnetic head) is arranged to confront the recording or reproducing surface of the magnetic sheet within this opening 2a. There is provided a counter ratchet wheel 3 which is arranged for indication of the number of recorded tracks. The ratchet wheel 3 is provided with many V-shaped grooves 3b which are formed in the periphery of the ratchet wheel 3. The container 2 has a part 4b of an elastic member 4 secured to a part of the housing thereof. A claw part 4a formed at the fore end of the elastic member 4 is arranged to engage the V-shaped grooves 3b of the ratchet wheel 3 to keep the ratchet wheel in place. The ratchet wheel 3 is provided with a shaft hole 3a which is arranged in the middle part of the ratchet wheel to engage a counter drive shaft (46 of FIG. 4) of the recording or reproducing apparatus which will be described later herein. This shaft hole is provided with a key hole 3a'. On the container 2 are provided indexes 2b which are arranged to indicate the number of recorded tracks through the position of the key hole 3a' relative to the indexes.

Figure 2:
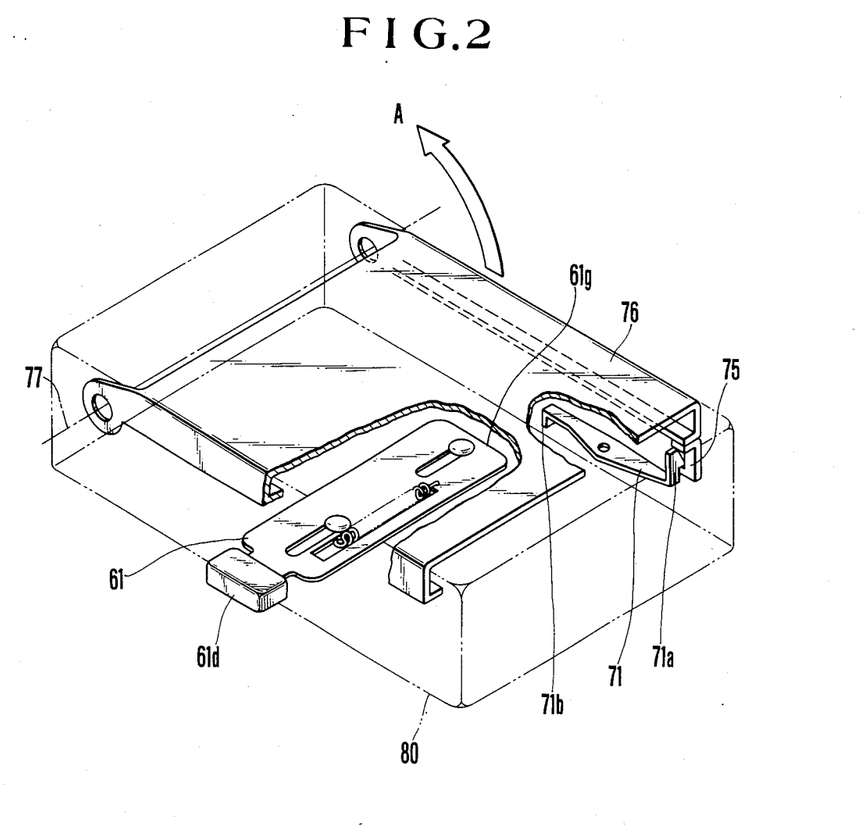
FIG. 2 is an oblique view showing the essential parts of a recording or reproducing apparatus to which the present invention is applicable.

FIG. 2 shows the structural arrangement of the recording or reproducing apparatus in its entirety. The apparatus includes a loading part 76 arranged to have the above-stated magnetic sheet container 2 loaded thereon; a box like body 80 of the apparatus; a rotating shaft 77 which is arranged to connect the loading part 76 to the box like body 80; an eject lever 61; an operation part 61d of the eject lever; a lock lever 71; and a lock member 75. A hook part 71a of the lock lever 71 engages the lock member 75 to keep the loading part 76 in a closed position on the box like body 80. However, when the operation part 61d of the eject lever 61 is pushed in, the end part 61g of the lever 61 comes to abut on one end 71b of the lock lever 71. The lock lever 71 is disengaged by this from the lock member 75. The disengagement then causes the loading part 76 to turn in the direction of arrow A due to the force of a spring which is not shown. Further, a spring which is not shown pushes the magnetic sheet container 2 to the outside of the loading part 76. The details of the eject lever will be described later herein.

Figure 4:
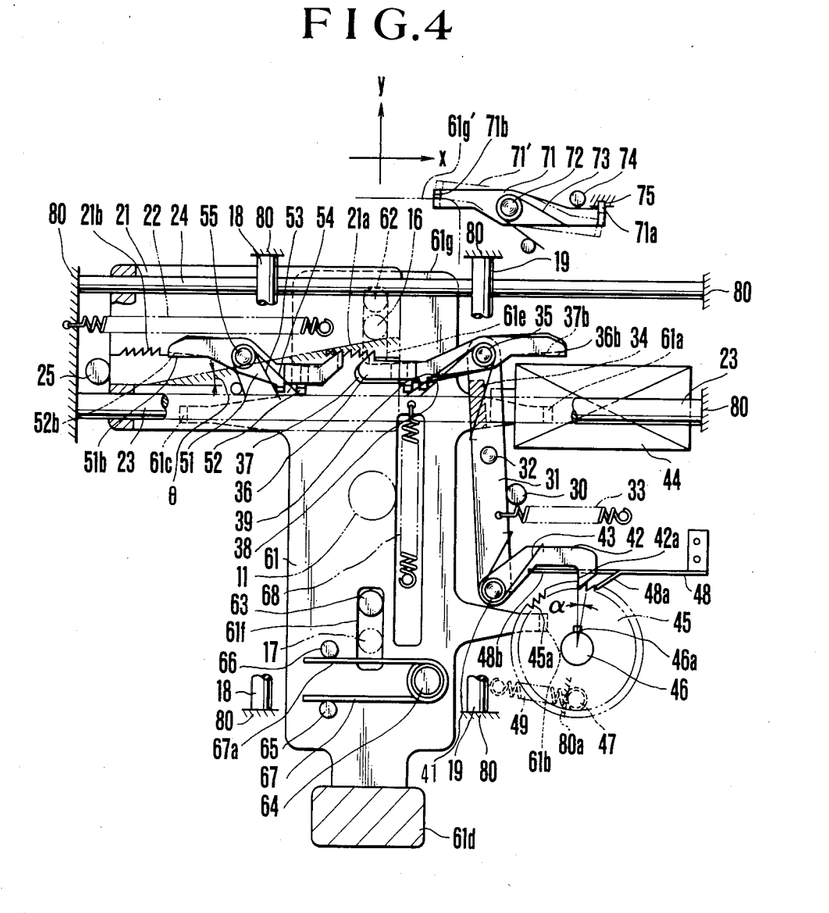
FIG. 4 is a plan view showing a lower portion of the same apparatus.

The details of the arrangement to advance the magnetic head and to control the position thereof in an embodiment of the present invention are as shown in FIGS. 3 and 4. For the sake of simplification of illustration, FIG. 3 shows the upper portion of the embodiment and FIG. 4 the lower portion thereof. With the above-stated loading part 76 in a closed state, the magnetic sheet container 2 is located in front of and in parallel with the plane of the drawing of FIG. 3. A control part of FIG. 4 is shown in enlarged detail in FIG. 5.

Figure 5:
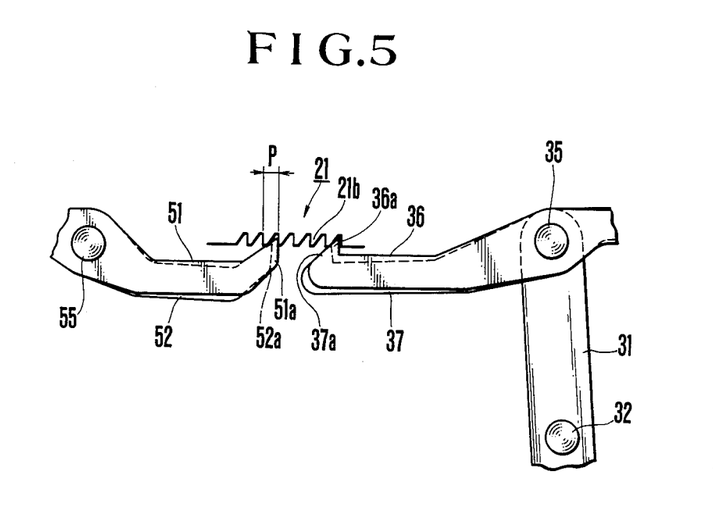
FIG. 5 is an enlarged detail view of a control part included in the embodiment shown in FIG. 4.

Referring to these drawings, a magnetic sheet driving shaft 11 is fitted into the shaft hole of the coupling part 1a of the magnetic sheet 1 shown in FIG. 1 and is arranged to rotate the magnetic sheet thereby. The driving shaft 11 is arranged to be driven by a motor 12. A magnetic head 14 is carried by a head carrier 13. There are provided two guide rails 18 and 19 which are carried within the box like body 80 in parallel to an axis y shown in FIGS. 3 and 4. The head carrier 13 is arranged to be linearly movable along these guide rails 18 and 19. The moving direction (the direction of the axis y) of the head carrier 13 corresponds to the movement of the gap part of the magnetic head 14 from the center of the rotating shaft 11 in the radial direction thereof. The embodiment includes a head carrier driving spring 15 which urges the head carrier 13 to move downward in the direction of the axis y as viewed on the illustration of FIG. 3 while one end of the spring 15 is secured to a pin 81 provided on the box like body 80. A follower pin 16 is located beneath the head carrier 13, i.e., behind the plane of the drawing as viewed on FIG. 3. The embodiment also includes an urging pin 17, a head control member 21, a spring 22, and guide rails 23 and 24. The head control member 21 is movable along an axis x which is perpendicular to the axis y. The spring 22 urges the control member 21 to move leftward in the direction of the axis x. The guide rails 23 and 24 are carried within the box like body 80 in parallel to the axis x. The head control member 21 is provided with a slanting part 21a and a ratchet part 21b as shown in FIGS. 4 and 5. The slanting part 21a is formed at an angle θ to the axis x and is arranged to have the follower pin 16 of the head carrier 13 abut thereon. The ratchet part 21b is formed at a pitch P as shown in FIG. 5. The leftward movement of the head control member 21 due to the urging force of the spring 22 in the direction of the axis x is restricted by a pin 25.

A pawl drive lever 31 is arranged to turn on a shaft 32 and is urged by a spring 33 to turn counterclockwise. However, the lever 31 is normally abutting on a positioning pin 30. The embodiment further includes an electromagnet 44; an attraction piece 34 which is provided on the pawl drive lever 31 and is arranged to be attracted by the electromagnet 44; advancing pawls 36 and 37 which are pivotally carried by one end of the pawl drive lever 31 through a shaft 35; and springs 38 and 39 which are arranged to respectively urge the advancing pawls 36 and 37 to move clockwise. These pawls 36 and 37 are respectively provided with claw parts 36a and 37a which are formed at the fore ends of these pawls and are arranged to be able to engage the ratchet part 21b of the control member 21 as shown in detail in FIG. 5. A positional difference between the claw parts 36a and 37a in the direction of the axis x is arranged to be P/2. When the attraction piece 34 provided on the pawl drive lever 31 is attracted by the electromagnet 44, the pawl drive lever 31 turns clockwise against the urging force of the spring 33. With the lever 31 turned in that manner, the advancing pawls 36 and 37 which are pivotally carried at one end of the lever 31 come to move rightward approximately in the direction of the axis x. Assuming that, in this instance, the moving extent in the direction of the axis x of the claw parts 36a and 37a which are arranged to be able to engage the ratchet part 21b is l, the shape and the location of the fulcrum of each lever concerned are arranged to be in a relation of $P/2 < l < P$.

A counter advancing pawl 42 is pivotally carried by the pawl drive lever 31 through a shaft 41 and is urged to turn clockwise by a spring 43. The claw part 42a which is formed at the fore end of the advancing pawl 42 is arranged to be able to engage the ratchet part of a counter drive gear 45. The counter drive gear 45 is provided with a drive shaft 46 which is disposed in the middle part of the gear. The drive shaft 46 is provided with a protrudent part 46a. The shaft 46 and the protrudent part 46a are respectively arranged to be able to engage the middle shaft hole 3a and a key hole part 3a' of the counter ratchet wheel 3 which is shown in FIG. 1. Further, the shaft 46 is urged by the force of a spring which is not shown in the direction of the plane of the illustration of FIG. 4 and is arranged to be axially slidable. With the embodiment loaded with the magnetic sheet container 2, the drive shaft 46 would not completely engage the shaft hole 3a of the counter ratchet wheel 3 and would rotate without driving the ratchet wheel 3 to rotate if the protrudent part 46a and the key hole part 3a' are not aligned. The drive shaft 46 and the shaft hole 3a of the counter ratchet wheel 3 come to completely engage with each other only when the positions of the protrudent part 46a and the key hole part 3a' coincide with each other. With the apparatus thus arranged to be capable of recording information on the magnetic sheet 1 only when there obtains complete engagement between the shaft 46 and the shaft hole 3a, an accident such as double or overlapped recording can be effectively prevented in cases where, for example, the container 2 is taken out halfway during a recording process and then is again loaded on the apparatus to resume the recording process, because the information to be recorded will never be recorded on a recorded track and will be recorded starting from a non-recorded track. The counter drive gear 45 is provided with a ratchet part 45a which is formed in the periphery of the gear 45 at a pitch angle $\alpha$. This pitch angle is the same as the pitch of the V groove 3b provided in the periphery of the above-stated counter ratchet wheel 3 and is arranged to engage the claw part 42a of the advancing pawl 42. Further, the drive gear 45 has an urging force of a spring 49 constantly applied thereto in a clockwise direction. The initial phase of the drive gear 45 is defined with a phase control pin 47 arranged on the gear 45 to abut on a fixed restricting part 80a. When the electromagnet 44 causes the drive lever 31 to turn clockwise, the counter advancing pawl 42 moves leftward approximately in the direction of the axis x. Assuming that the rotating angle of the drive gear 45 caused by the advancing pawl 42 in that instance is $\beta$, the shapes of the lever, 31, the pawl 42 and the gear 45 are arranged to provide a relationship of $\alpha < \beta < 2\alpha$.

The drive gear 45 is prevented from rotating in a reverse direction by a reverse rotation preventing plate spring 48. The plate spring 48 is fixedly disposed in a position close to the gear 45 and is provided with a preventing claw 48a which prevents the rotation of the drive gear 45 in the direction opposite to the advancing direction of the advancing pawl 42 and also with an extension part 48b which is arranged to engage an arm part of the eject lever which will be described later herein.

Position restricting pawls 51 and 52 are pivotally carried by a common shaft 55. Meanwhile, springs 53 and 54 are arranged to apply counterclockwise rotating forces to these pawls 51 and 52. Claw parts 51a and 52a are respectively formed at the fore ends of these pawls 51 and 52 and are arranged to be able to engage the ratchet part 21b of the control member 21 as shown in FIG. 5. The positional difference between the fore ends of the claw parts 51a and 52a is arranged to be P/2.

A reference numeral 61 indicates the eject lever, which is provided with slots 61e and 61f which extend in the direction of the axis y. The eject lever 61 is thus arranged to be guided respectively by shafts 62 and 63 which engage these slots. Although the eject lever 61 is urged to move in the direction of the axis y downward as viewed on FIG. 4 by the force of the spring 68, the slot 61e and the shaft 62 jointly keep the lever 61 in the position as shown in FIG. 4 under normal conditions. The eject lever 61 is further provided with three arms 61a, 61b and 61c. These arms are arranged to come into contact with the ends 36b and 37b of the advancing pawls 36 and 37, the counter advancing pawl 42, the extension part 48b of the plate spring 48 and the ends 51b and 52b of the position restricting pawls 51 and 52 respectively. Between pins 64, 65 and 66 which are provided on the eject lever 61, there is arranged an urging spring 67 as shown in FIG. 4 in such a manner that a prescribed degree of initial stress is developed within the urging spring 67 by means of the pins 65 and 66. One branch 67a of the spring 67 and an urging pin 17 which is provided on the head carrier 13 are arranged to come into contact with each other as will be further described later herein. The end part 61g of the eject lever 61 is arranged to be able to engage one end 71b of the lock lever 71 as has been described in the foregoing with reference to FIG. 2.

The lock lever 71 is urged by a spring 73 to turn counterclockwise on a shaft 72 and its position is normally restricted by a pin 74. As has been mentioned in relation to FIG. 2, when the container loading part 76 is closed on the box like body 80 with the loading part 76 having been loaded with the container 2, the shaft hole part of the coupling part 1a of the magnetic sheet 1 engages the magnetic sheet driving shaft 11. At that instant, if their phases coincide with each other, the counter drive shaft 46, its protrudent part 46a come to engage the shaft hole 3a and the key hole part 3a' of the counter ratchet wheel 3. Meanwhile, the lock member 75 which is provided on the container loading part 76 comes to engage the hook part 71a of the lock lever 71 in such a way as to lock the loading part 76 in its position on the box like body 80.

With the loading part 76 loaded with the container 2 and closed on the box like body 80 as described above, the magnetic sheet 1 begins to rotate when the motor 12 is started and information is recorded on or reproduced from the sheet 1 by means of the magnetic head 14. Then, the electromagnet 44 is operated to intermittently attract the attraction piece 34 thereby to cause the drive lever 31 to turn clockwise for moving the magnetic head stepwise from one track to another. This clockwise turning of the pawl drive lever 31 causes the advancing pawl 36 to move the head control member 21 to an extent as much as the distance l to the right in the direction of the axis x. When the attracting action of the electromagnet 44 terminates, the spring 22 tries to pull back the control member 21 to the left in the direction of the axis x. At that instant, however, the tip 52a of the position restricting pawl 52 which is disposed away from the other position restricting pawl 51 by as much as a distance P/2 comes to engage the ratchet part 21b of the control member 21. As a result of this, the head control member 21 is thus moved to the right in the direction of the axis x just to an extent or distance P/2. After that, when the electromagnet 44 again attracts the attraction piece 34, the head control member 21 is further moved to the right in the direction of the axis x just to an extent P/2 jointly by the advancing pawl 37 and the position restricting pawl 51 in this instance. In this manner, the stepwise advancing action of the head control member 21 is repeated every time the electromagnet 44 operates.

The head control member 21 has a slanting part 21a which is slanting at an angle $\theta$ to the axis x while the follower pin 16 which is provided on the head carrier 13 is abutting upon the slanting part 21a as mentioned in the foregoing. Therefore, when the head control member 21 moves rightward to an extent P/2 to reduce a cam lift effected by the slanting part 21a, the urging force of the spring 15 causes the head carrier 13 to move as much as $\frac{1}{2}$P·tan $\theta$ in the direction of the axis y or downward as viewed on FIG. 4. In other words, the distance between one track and another on the magnetic sheet 1 is arranged to be $\frac{1}{2}$P·tan $\theta$, that is, the values of P and $\theta$ mentioned above are determined according to the distance between the tracks. This arrangement enables the magnetic head 14 to be moved forward from one track to another every time the attracting action is performed by the electromagnet 44. The magnetic head 14 is thus moved downward (as viewed in FIG. 4) by virtue of the spring 15. The position of the head is shifted from one track to another and is controlled by the cooperative operation of the electromagnet 44, the advancing pawls 36 and 37, the position restricting pawls 51 and 52, the slanting part 21a and the follower pin 16.

In the case of apparatus which is arranged as described above, the magnetic head 14 is moved by means of the head carrier drive spring 15. Therefore, unlike conventional apparatus, the apparatus according to the invention does not require a large source of an electromagnetic driving force for driving the head. The arrangement of the invention thus contributes to reduction in the size of the apparatus and in the power consumption thereof. Further, the gradient of the slanting part 21a of the head control member 21 is arranged to be at an angle $\theta$ in a counterclockwise direction relative to the moving direction of the control member 21. Therefore, assuming that the urging force of the drive spring 15 on the head carrier 13 is F, a component of force of F tan $\theta$ is exerted on the head control member 21 through the follower pin 16 in the moving direction of the member. Therefore, the electromagnet 44 does not have to exert a large attracting force. Further the advancing extent suited for the pitch of the tracks can be determined by adjusting the slanting angle $\theta$ and also the allocation of the above-stated component of force. This allows a greater latitude for the structural arrangement of the apparatus. In the above-described specific embodiment, the advancing pawls 36 and 37 and the position restricting pawls 51 and 52 are arranged in two pairs. However, it will be apparent that the same operation can be accomplished with these pawls arranged in one pair. The number of pairs is determined according to the advancing extent between the tracks, the workability of the ratchet, etc. Further, it is of course possible to replace the electromagnet 44 with some other suitable intermittent driving mechanism.

The pawl drive lever 31 turns clockwise and the counter advancing pawl 42 causes the drive gear 45 to rotate counterclockwise, through as much as an angle $\theta$ every time the attraction piece 34 is attracted by the electromagnet 44 as described in the foregoing. However, the counter ratchet wheel 3 then rotates through as much as an angle $\alpha$ each time because the V-shaped groove 3b of the counter ratchet wheel 3 which is disposed on the container 2 (see FIG. 1) is held by the claw part 4a of the elastic member 4 at a pitch angle $\alpha$. Meanwhile, the drive gear 45 tends to move backward somewhat but also rotates through as much as the angle $\alpha$ each time. Further, in this instance, the drive gear 45 is prevented from rotating backward by the preventing claw 48a of the plate spring 48. In accordance with the arrangement of the apparatus described above, the head control member 21 and the counter drive gear 45 are arranged to be driven by the common pawl driving lever 31. The arrangement therefore permits simplification of the structural arrangement, improvement in the head driving responsivity and also reduction in size of the apparatus.

When taking out the container 2 from the loading part 76, the operation part 61d of the eject lever 61 is pushed upward as viewed on the illustrations of FIGS. 3 and 4. With the operation part 61d pushed upward, one branch 67a of the spring 67 and the urging pin 17 provided on the head carrier 13 first come to abut each other. Then, with the operation part 61d further pushed, the head carrier 13 is moved via the urging pin 17 upward in the direction of the axis y. At this time, since the initial force of the spring 67 is arranged to be somewhat larger than the urging force of the spring 15, the spring 15 can be charged by the movement of the head carrier 13. The head carrier 13 then comes to abut on the pin 20 (FIG. 3) to complete the charging action on the spring 15. Upon completion of charging, the three arms 61a, 61b and 61c of the eject lever 61 abut respectively on the ends 36b and 37b of the advancing pawls 36 and 37, the pawl 42, the extension part 48b of the plate spring 48, and the ends 51b and 52b of the position restricting pawls 51 and 52. After that, the upward movement of the eject lever 61 in the direction of the axis y as viewed on FIG. 4 causes the advancing pawls 36 and 37 to turn counterclockwise on the shaft 35. This disengages the end claw parts 36a and 37a of these advancing pawls 36 and 37 from the ratchet part 21b of the head control member 21. The counter advancing pawl 42 then turns counterclockwise on the shaft 41 to disengage its claw part 42a from the peripheral ratchet part 45a of the counter drive gear 45. The plate spring 48 is then curved clockwise on its fixed part to disengage the preventing claw 48a thereof from the peripheral ratchet part 45a of the drive gear 45. Further, the position restricting pawls 51 and 52 turn clockwise on the shaft 55 to disengage their claw parts 51a and 52a from the above-stated ratchet part 21b of the head control member 21. At that instant, the spring 67 bends to absorb the stress which tends to move the urging pin 17. At the point of time when the advancing pawls 36 and 37 and the position restricting pawls 51 and 52 are disengaged from the ratchet part 21b, the head control member 21 is brought back to its initial position by the urging force of the spring 22. Meanwhile, the drive gear 45 is not brought back to its initial position by mere disengagement of the claw part 42a and the preventing claw 48a from the peripheral ratchet part 45a thereof. This is because, under this condition, the counter driving shaft 46 and its protrudent part 46a are in engagement with the shaft hole 3a and the key hole 3a' of the ratchet wheel 3 disposed on the side of the container 2 and then the ratchet wheel 3 is kept in a locked state with the claw part 4a of the elastic member 4 engaging the V-shaped groove 3b formed on the periphery of the ratchet wheel 3.

In the last stage of the movement of the eject lever 61 in the direction of the axis y, one end 61g of the eject lever 61 comes to abut on one end 71b of the lock lever 71 as indicated by reference numeral 61g' in FIG. 4. Again referring to FIG. 4, the lock lever 71 (71' in FIG. 4) turns clockwise to take a position where the lever is disengaged from the lock member 75. This disengagement then releases the loading part 76 from the state of being locked to the box like body 80. Then, it becomes possible to take out the container 2, for example, by pushing it out of the loading part 76 by means of the urging force of a spring which is not shown. When the loading part 76 and the box like body 80 are released from their closed state, the magnetic sheet drive shaft 11 is disconnected from the coupling part 1a of the magnetic sheet 1 while the counter drive shaft 46 and its protrudent part 46a are also disconnected from the shaft hole 3a and the key hole part 3a' of the ratchet wheel 3 respectively. Then, the force of the spring 49 acting on the drive gear 45 causes the drive gear 45 to rotate clockwise to come back to its initial phase where the position control pin 47 abuts on the restricting part 80a. When the operation part 61d is released from the pushing operation, the urging force of the spring 68 brings the eject lever 61 back to its initial position.

Further, the eject lever 61 may be arranged to be movable in response to an operation to open the container loading part 76. In that instance, the locking mechanism consisting of the lock lever 71 and the lock member 75 shown in FIGS. 2 and 4 may be replaced with a manual operating lock mechanism; the loading part 76 may be allowed to turn in the direction of arrow A of FIG. 2 by releasing it from the lock mechanism; and this turning movement may be converted into a linear movement (upward in the direction of the axis y as viewed on FIGS. 3 and 4) of the eject lever 61 by means of some additionally arranged cam mechanism or the like.

As has been described in the foregoing, the spring 15 which is provided for driving the head carrier 13 is arranged to be charged as a result of the step of taking out the container 2 of the magnetic sheet 1 which is an indispensable step in the operation of the recording or reproducing apparatus. Therefore, this contributes to simplification of the structural arrangement and the operation. Further, since the container loading part 76 is released from its state of being locked to the box like body 80 after the head carrier drive spring 15 has completely been charged, the container 2 can be safely taken out of the loading part.

Figure 6:
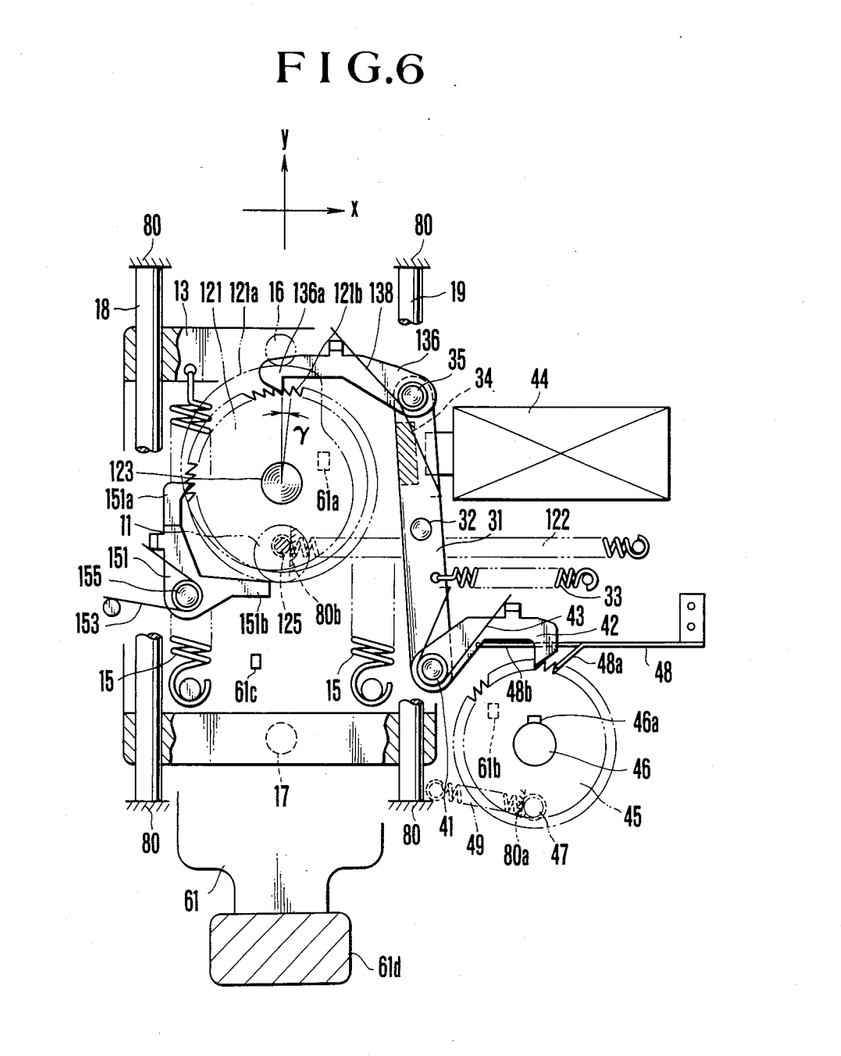
FIG. 6 is a plan view showing a recording or reproducing apparatus which is another embodiment of the invention.

A second embodiment example of the invention is as shown in FIG. 6. It is a main point of difference of the second embodiment from the first that the magnetic head control member and the cam and ratchet parts which are in association with the head control member are arranged to make rotating motions. In FIG. 6, the members which are indicated by the same reference numerals as those used in the preceding drawings are arranged and operate basically in the same manner as the corresponding members of the first embodiment and, therefore, do not require any detailed description.

Referring to FIG. 6, the embodiment includes the head control member 121 which is rotatable on a shaft 123 and is provided with a cam part 121a and a ratchet part 121b. The follower pin 16 which is provided on the head carrier 13 abuts on the cam part 121a. The cam lift of the cam part 121a is arranged to decrease to move the follower pin 16 just to an extent corresponding to one track for one pitch of the ratchet part 121b. The embodiment further includes a spring 122 and a pin 125. The pin 125 is disposed on the head control member 121. An urging force of the spring 122 is constantly applied in a counterclockwise direction to the head control member 121 through the pin 125. The initial position of the head member 121 is determined also by the pin 125 and the restricting part 80b. An advancing pawl 136 is pivotally connected to one end of the pawl drive lever 31 via the shaft 35 with an urging force of a spring 138 being exerted counterclockwise on the advancing pawl 136. The advancing pawl 136 is provided with a claw part 136a which is arranged to be able to engage the ratchet part 121b of the head control member 121. Meanwhile, a position restricting pawl 151 has a clockwise urging force of a spring 153 exerted thereon urging it to turn on a shaft 155. The claw part 151a of the position restricting pawl 151 is also arranged to be able to engage the ratchet part 121b of the head control member 121.

When the attraction piece 34 which is provided on the drive lever 31 is attracted by the electromagnet 44, the drive lever 31 turns clockwise to cause the counter drive gear 45 to rotate by one pitch. The advancing pawl 136 also moves rightward approximately in the direction of the axis x to cause the head control member 121 to rotate clockwise. In this instance, assuming that the extent to which the head control member 121 is moved is $\delta$ and one pitch of the ratchet part 121b thereof $\gamma$, the embodiment is arranged to have a relation of $\gamma < \delta < 2\gamma$. This arrangement causes the head control member 121 to move clockwise as much as one pitch every time the electromagnet performs an attracting action. This rotation of the head control member 121 causes the cam part 121a to rotate to move the head carrier 13 via the follower pin 16 as much as one track at a time in the direction of the axis y downward as viewed on FIG. 6.

In the embodiment example shown in FIG. 6, the cam lift of the cam part 121a is also arranged to decrease when the head control member 121 rotates clockwise. Therefore, in the same manner as in the case of the preceding embodiment, a component of the force of the head carrier driving spring 15 is added to the clockwise rotation of the head control member 121, so that the head control member 121 can be operated with a very small force. Accordingly, this permits reduction in the driving force of the electromagnet 44 in the same manner as in the preceding example.

In taking out the magnetic sheet container 2, when the eject lever 61 is pushed upward in the direction of the axis y, the spring 15 is charged. The three arms 61a, 61b and 61c of the eject lever 61 come to abut respectively on the advancing pawl 136, the counter advancing pawl 42, the plate spring 48 and one end 151b of the position restricting pawl 151. This causes the end claw part 136a of the advancing pawl 136 to disengage from the ratchet part 121b, the counter advancing pawl 42 and the plate spring 48 to disengage from the counter drive gear 45 and the claw part 151a of the position restricting pawl 151 to disengage from the ratchet part 121b. As a result of this, the head control member 121 is brought back to its initial position by the urging force of the spring 122. Further, although not shown in FIG. 6, a lock lever and a lock member which correspond respectively to the lock lever 71 and the lock member 75 of FIGS. 3 and 4 are disengaged from each other to release the container loading part 76 from a state of being locked to the box like body 80. With the loading part 76 thus unlocked, the container 2 can be taken out. In this instance, the counter drive gear 45 comes back to its initial position in the same manner as in the case of FIG. 4. Meanwhile, the arrangement and operation required for displaying the recorded number of tracks at the counter ratchet wheel are also idential with those of the preceding embodiment.

In the embodiment examples described in the foregoing, the invention is applied to apparatuses arranged to use a magnetic sheet having recording tracks concentrically thereon. However, the invention is applicable also to an apparatus wherein a recording track is arranged to be formed in a helical manner. In such a case, the embodiment illustrated in FIGS. 3 to 5, for example, has the electromagnet 44 replaced with a continuous drive arrangement such as an elastic member or a motor; the advancing pawls 36 and 37, the position restricting pawls 51 and 52 and the pawl driving lever 31 replaced with a transmission mechanism which continuously operates such as gears, in combination with clutch means; and the counter advancing pawl 42 replaced with a continuously operating transmission mechanism in combination with clutch means.

Further, in the specific embodiments of the invention described in the foregoing, the recording or reproducing head is arranged to be advanced by means of the charged elastic member. Unlike conventional apparatuses of this kind, this arrangement obviates the necessity of using a large electromagnetic drive device. The described embodiments, therefore, greatly contribute to reduction in size of the apparatus and also in power consumption. Further, the use elastic energy as a drive source for advancing the recording or reproducing head results in an improved responsiveness, which permits the head to have an increased number of shifts of tracks per unit time. Another advantage of the embodiments of the invention arises in that the elastic member which serves as an advancing drive source for the recording or reproducing head can be charged in association with removal of the recording medium which is indispensable for a recording or reproducing apparatus and this arrangement results in simplification of the structural arrangement and operation required for charging the elastic member.

A component of the elastic force required for advancing the head is arranged to be directed in the direction in which the control member is to be moved, so that the position of the head can be controlled with a small control driving force. Further, the embodiments allow a greater latitude for the structural arrangement of the apparatus because the advancing extent and the allocation of the component of force can be adjusted and determined by adjusting the slanting degree of the slanting surface (see FIG. 4) required for obtaining the component of force and the shape of the cam part (FIG. 6). The arrangement to drive and advance the head by the elastic force and to produce a component of the elastic force in the direction in which the head control member is to be moved results in an improved responsivity of the head position control, so that the amount of tracks for which the head is movable per unit of time can be increased.

In the apparatus according to the invention, the control means for controlling the position of the recording or reproducing head and the counting or measuring means for counting or measuring the head position or the amount of tracks recorded or reproduced are arranged to be driven by a common drive means. This arrangement not only permits simplification of the structural arrangement but also enhances the reliability of the operation of the apparatus. Then, the simplified structural arrangement permits reduction in the inertia of the driving part. Therefore, the responsivity of the driving action on the recording or reproducing head can be improved and the whole apparatus can be arranged in a compact size.

In accordance with the structural arrangement of an embodiment of the invention, the recording or reproducing head is linearly advanced with the head carrier which supports the head arranged to be guided by a plurality of guide rails arranged in parallel with each other. In cases where each of the recording tracks is to be used for recording one kind of or one unit of information thereon, the linear advancing of head readily permits alignment of the starting points of different units of information in a radial direction of the recording medium. While specific embodiments of the invention have been shown and described in detail to illustrate the application of the invention priciples, it will be understood that the invention may be embodied otherwise without departing from such principles.

What is claimed is:

1. A recording and/or reproducing apparatus comprising:
   (A) a head for signal recording and/or reproducing against a recording medium in a predetermined loaded position;
   (B) a movable carriage member for carrying said head along a surface of said medium between a first and a second position;
   (C) a spring member for urging said carriage member in a direction from said first to said second position along said surface of said medium;
   (D) control means including a cam member for controlling the movement of said carriage member in said direction by an urging force of said spring member;
   (E) reset means for shifting said carriage member to said first position and for charging said spring member; and (F) eject means responsive to said shifting operation of said reset means for ejecting said medium from said loaded position.

2. The apparatus according to claim 1, wherein said cam member is arranged to be linearly movable.

3. The apparatus according to claim 1, wherein said cam member is arranged to be rotatable.

4. The apparatus according to claim 1, wherein said recording medium is of a rotary type, wherein said apparatus further comprises rotation means for rotating the medium relative to said head.

5. The apparatus according to claim 4, wherein said recording medium is disc-shaped and said rotation means includes a rotation spindle engageable with the medium to rotate the same.

6. A recording and/or reproducing apparatus comprising:
(A) a head for signal recording and/or reproducing against a recording medium in a predetermined loaded position;
(B) a movable carriage member for carrying said head along a surface of said medium between a first and a second position and having a cam follower;
(C) guide means for linearly guiding said carriage member along a direction from said first to said second position;
(D) a spring member for urging said carriage member in a direction from said first to said second position along said surface of said medium;
(E) a cam member engageable with the cam follower of said carriage member to control the movement thereof; and
(F) drive means for driving said cam member so that said carriage member is allowed to move in said direction by an urging force of said spring member;
(G) reset means for shifting said carriage member to said first position and for charging said spring member; and
(H) eject means responsive to said shifting operation of said reset means for ejecting said medium from said loaded position.

7. The apparatus according to claim 6, wherein said cam member is arranged to be linearly movable.

8. The apparatus according to claim 6, wherein said cam member is arranged to be rotatable.

9. The apparatus according to claim 6, wherein said recording medium is of a rotary type and wherein said apparatus further comprises rotation means for rotating the medium relative to said head.

10. The apparatus according to claim 9, wherein said recording medium is disc-shaped and said rotation means includes a rotation spindle engageable with the medium to rotate the same.

* * * * *